(12) United States Patent
Shalaby

(10) Patent No.: US 6,551,580 B2
(45) Date of Patent: Apr. 22, 2003

(54) PHOSPHONYLATED DERIVATIVES OF ALIPHATIC HETEROCHAIN AND ACRYLATE POLYMERS AND APPLICATIONS THEREOF

(76) Inventor: Shalaby W. Shalaby, 6309 Highway 187, Anderson, SC (US) 29625

( * ) Notice: Subject to any disclaimer, the term of this patent is extended or adjusted under 35 U.S.C. 154(b) by 0 days.

(21) Appl. No.: 10/153,008

(22) Filed: May 22, 2002

(65) Prior Publication Data

US 2002/0187113 A1 Dec. 12, 2002

Related U.S. Application Data

(62) Division of application No. 09/464,870, filed on Dec. 16, 1999, now Pat. No. 6,395,259.
(60) Provisional application No. 60/116,408, filed on Jan. 19, 1999.

(51) Int. Cl.[7] .............................. A61K 7/16; C08F 20/02
(52) U.S. Cl. .................. 424/57; 525/329.7; 525/329.8; 525/330.3; 525/340; 525/403; 525/418; 526/274; 526/278; 524/81
(58) Field of Search .......................... 525/329.7, 329.8, 525/330.3, 340, 403, 418; 526/274, 278; 424/57; 524/81

(56) References Cited

U.S. PATENT DOCUMENTS

| | | | |
|---|---|---|---|
| 3,069,372 A | 12/1962 | Schroeder et al. ............ 260/27 |
| 3,097,194 A | 7/1963 | Leonard, Jr. et al. ...... 260/88.2 |
| 3,278,464 A | 10/1966 | Boyer et al. ................. 260/2.5 |
| 4,207,405 A | 6/1980 | Masler, III et al. .......... 525/328 |
| 4,500,684 A | 2/1985 | Tucker .................... 525/327.3 |
| 4,581,415 A | 4/1986 | Boyle, Jr. et al. ........ 525/332.2 |
| 4,678,840 A | 7/1987 | Fong et al. .................. 525/340 |
| 4,774,262 A | 9/1988 | Blanquet et al. .............. 521/31 |
| 4,814,423 A | 3/1989 | Huang et al. ................ 528/330 |
| 4,966,934 A | 10/1990 | Huang et al. ................ 524/315 |
| 5,491,198 A | 2/1996 | Shalaby et al. ............. 525/340 |
| 5,558,517 A | 9/1996 | Shalaby et al. .......... 433/201.1 |

FOREIGN PATENT DOCUMENTS

| | | | |
|---|---|---|---|
| EP | 395427 A2 | 4/1990 | .......... A61K/6/083 |
| GB | 2319251 A | 10/1997 | ............. C07F/9/40 |

OTHER PUBLICATIONS

Shalaby et al., *J. Polym. Sci.–Polym. Phys. Ed.,* 11, 939–949(1973).
Shalaby and Reimschuessel, *J. Polym. Sci.–Polym. Chem. Ed.,* 15, 1349 (1977).

*Primary Examiner*—Samuel A. Acquah
(74) *Attorney, Agent, or Firm*—Leigh P. Gregory

(57) ABSTRACT

A variety of phosphonylated heterochain polymers are disclosed, including, most preferably, phosphonylated polymethyl methacrylate. For each polymeric composition the phosphorous atom of a phosphorous-containing functional group is covalently bonded to a carbon atom of the polymeric chain. The phosphorous atoms are present in an amount of at least about 0.1 percent by weight in each polymeric composition.

4 Claims, No Drawings

PHOSPHONYLATED DERIVATIVES OF ALIPHATIC HETEROCHAIN AND ACRYLATE POLYMERS AND APPLICATIONS THEREOF

This application is a division of U.S. Ser. No. 09/464,870 filed Dec. 16, 1999 now U.S. Pat. No. 6,395,259, which claims benefit of Provisional Application Ser. No. 60/116,408 filed Jan. 19, 1999.

BACKGROUND OF THE INVENTION

Phosphonylation of organic compounds and polymers has been documented in the prior art. Early applications focused on mass phosphonylation of non-functional polymers to introduce phosphonylate groups randomly along their carbon chain by allowing a solution of these polymers in phosphorous trichloride to interact with gaseous oxygen (U.S. Pat. No. 3,097,194; U.S. Pat. No. 3,278,464). For example, U.S. Pat No. 3,097,194 to Leonard is directed to a process for preparing elastomeric phosphonylated amorphous copolymers of ethylene and propylene which are essentially free of low molecular weight polymer oils. Phosphorylation, or esterification of the copolymer, is conducted in situ of the copolymer solution mass after inactivating a polymerization catalyst with water and oxygen to convert the catalyst to an inert metal oxide. Oxygen is then bubbled through the reaction mass in the presence of phosphorous trichloride to obtain the phosphorylated copolymer.

An example of phosphonated polymers is provided in U.S. Pat. No. 3,278,464 to Boyer et al. In accordance therewith, ethylenically unsaturated polymers are reacted with an organic-substituted phosphorous compound to produce phosphonated polymers. Like the process described above, attachment of the phosphorous groups results in near-homogeneous, or mass, phosphonylation within the polymer and phosphorous compounds are combined in a solvent system.

Moreover, in U.S. Pat. No. 4,207,405 to Masler et al., polyphosphates are provided that are the homogeneous reaction products, in an organic solvent, of phosphorous acid or phosphorous trichloride and a water-soluble carboxyl polymer. U.S. Nat. No. 3,069,372 to Schroeder et al., U.S. Pat. No. 4,678,840 to Fong et al., U.S. Pat. No. 4,774,262 to Blanquet et al., U.S. Pat. No. 4,581,415 to Boyle Jr., et al., and U.S. Pat. No. 4,500,684 to Tucker show various phosphorous-containing polymer compounds. U.S. Pat. Nos. 4,814,423 and 4,966,934 to Huang et al., describe adhesives for bonding polymeric materials to the collagen and calcium of teeth. For bonding to calcium, the adhesive employs an ethylenically unsaturated polymeric monophosphate component. A tooth is coated with the adhesive and then a filling is applied.

More recently, restricting the phosphonylation to the surface of polymeric substrates was achieved to produce articles with surface-phosphonylate functionalities and practically intact bulk (U.S. Pat. Nos. 5,491,198 and 5,558,517 to Shalaby et al.). This was achieved by gas phase phosphonylation of a preformed article with $PCl_3$ and $O_2$ or passing through a solution of $PCl_3$ in a non-reactive organic liquid that is also a non-solvent for the polymeric article. In effect, a process for phosphonylating the surface of an organic polymeric preform and the surface-phosphonylated preforms produced thereby are provided. Organic polymeric preforms made from various polymers including polyethylene, polyether-ether ketone, polypropylene, polymethyl methacrylate, polyamides and polyester, and formed into blocks, films, and fibers may have their surfaces phosphonylated according to that process. The process involves the use of a liquid medium that does not dissolve this organic polymeric preform but does dissolve a phosphorous halide such as phosphorous trichloride, and the like. The process allows for surface phosphonylation of the organic polymeric preform such that up to about 30 percent but preferably up to about 20 percent, of the reactive carbon sites in the polymer are phosphonylated. The phosphonylated organic polymers are particularly useful as orthopedic implants because hydroxyapatite-like surfaces which can be subsequently created on the organic implants allow for co-crystallization of hydroxyapatite to form chemically bound layers between prosthesis and bone tissue.

Although various phosphonylated polymers are known, the prior art is deficient in affording phosphorous-containing groups randomly and covalently attached to carbon atoms of aliphatic chains and pendant side groups of organo-soluble polymers such as polyalkylene oxides, polyamides, polyesters, and acrylate polymers, that are tailored for use in specified technology areas.

SUMMARY OF THE INVENTION

In one aspect the present invention is directed to a randomly phosphonylated acrylate polymeric composition which includes an acrylic polymer and phosphorous-containing functional groups, wherein the phosphorous atom of each functional group is covalently bonded to a carbon atom of the acrylic polymer and wherein the phosphorous atoms comprise at least about 0.1 percent by weight of the polymeric composition.

Preferably, the acrylic polymer is polymethylmethacrylate and the phosphorous atoms comprise at least 0.5 percent by weight of the polymeric composition. Optionally, the acrylic polymer is based on methylmethacrylate and methacrylic acid repeat units. It is also within the scope of the present invention that the acrylic polymer includes at least one polymerizable side group per chain, preferably a group derived from a bis-acrylate monomer, most preferably, ethylene bis-methacrylate.

A preferred application for the phosphonylated acrylate polymeric composition of the present invention is as a dental product such as a varnish or sealer, preferably one which includes fluoride ions which may be released on a controlled manner. It is also desirable that the dental product made in accordance with the present invention includes bioactive compounds such as antimicrobials, anti-inflammatory drugs, or pain-relieving agents, with the polymeric composition being capable of regulating the release of the bioactive compounds.

In another aspect the present invention is directed to a randomly phosphonylated polyalkylene oxide polymeric composition which includes a polyalkylene oxide polymer and phosphorous-containing functional groups, wherein the phosphorous atom of each of the functional groups is covalently bonded to a carbon atom of the polyalkylene oxide polymer and wherein the phosphorous atoms comprise at least about 0.1 percent by weight of the polymeric composition. Preferably the alkylene group of the polyalkylene oxide polymer has from two to six carbon atoms.

In yet another aspect the present invention is directed to a randomly phosphonylated polyamide composition which includes a polyamide polymer and phosphorous-containing functional groups, wherein the phosphorous atom of each of the functional groups is covalently bonded to a carbon atom of the polyamide polymer and wherein the phosphorous atoms comprise at least about 0.1 percent by weight of the composition. Preferably, the polyamide is the polymerization product of N-alkyl laurolactam.

In a still further aspect the present invention is directed to a randomly phosphonylated polyester composition which includes a polyester polymer and phosphorous-containing functional groups, wherein the phosphorous atom of each of the functional groups is covalently bonded to a carbon atom of the polyester polymer and wherein the phosphorous atoms comprise at least about 0.1 percent by weight of the composition. Preferably the polyester is poly-$\epsilon$-caprolactone. The present polyester composition is especially useful as a flame retardant additive for polyesters and polyurethanes.

All of the present inventive polymeric compositions may include a bioactive compound linked to the phosphonyl functionality.

DETAILED DESCRIPTION OF THE PREFERRED EMBODIMENTS

The present invention deals with novel phosphonylated derivatives of polyalkylene oxides, N-substituted aliphatic polyamides, and acrylate polymers, and preferably, specifically, polyethylene oxide (PEO), N-ethyl, Nylon 12 (N-12) [description of alkylated N-12 can be found in Shalaby et al., *J. Polym. Sci.-Polym. Phys. Ed.*, 11,1 (1973)], and polymethyl methacrylate (PMMA). Generally, the phosphonylation of the representative members of these groups of polymers occurs by bubbling oxygen through a polymer solution in $PCl_3$ with or without a non-reactive organic solvent. The resulting phosphonyldihalide-bearing polymers may then be converted to corresponding phosphonic acid and its metal salts, amides, imides, or esters. Conversion to (1) phosphonic acid is achieved by reacting with water in the presence or absence of an acidic or basic catalyst (followed by acidification); (2) amides by reacting with an amine; (3) imides by reacting with a primary or secondary amide (as in the case of the sodium salt of $\epsilon$-caprolactam); and (4) esters by reacting with an alcohol or phenol.

A preferred composition of the present invention is a phosphonylated PMMA having more than 0.1 percent phosphorous, present as phosphonic acid functionality, with the phosphonic acid being the dominant phosphonyl functionality. Another preferred composition of this invention is a derivative of the phosphonylated PMMA wherein the methyl ester groups of PMMA are partially or fully hydrolyzed [that take place during the hydrolysis of —$P(O)Cl_2$ to $P(O)(OH)_2$] are reacted (esterified) with a glycidyl acrylate (such as glycidyl methacrylate) to introduce a polymerizable acrylic side group onto the phosphonylated PMMA (PPMMA) chain. Another preferred composition of this invention is the reaction product of the PMMA [through the —$P(O)Cl_2$ functionality] with hydroxyethyl methacrylate (through the —OH group) to yield a product (PMH) having a phosphonate ester side group with a polymerizable acrylic functionality. Another preferred composition of this invention is a phosphonylated polyethylene oxide (OPPO) having more than 0.1 percent phosphorous present primarily as phosphonic acid groups, phosphonyl dichloride and their respective derivative with hydroxy- or amine-bearing bioactive compounds. Another preferred composition of this invention is a phosphonylated N-alkylated Nylon 12 and more preferably N-ethyl Nylon 12 having more than 0.1 percent phosphorous present primarily as phosphonic acid. Another preferred composition of this invention is a derivative of the phosphonylated N-ethyl Nylon-12, wherein the initial phosphonyl dihalide groups are reacted with sodium $\epsilon$-caprolactam [using a similar process to that described by Shalaby and Reimschuessel, *J. Polym. Sci.-Polym. Chem.* Ed., 15, 251 (1977)]. Another preferred composition of this invention is phosphonylated polyester and more preferably poly-$\epsilon$-caprolactone having more than 0.1 percent P as free phosphonic acid or dialkyl phosphonate groups. The latter can be prepared by reacting the initial phosphonylation product bearing phosphonyl dihalide groups with an alcohol such as ethanol or methanol.

Of the many possible applications of the new compositions subject of this invention, the following are representative systems:

1. Phosphonylated PMMA and Derivatives—These can be used in several dental applications pertinent to (a) desensitizing through interaction with $Ca^{+2}$ in the biologic environment to seal the teeth surface and fill the micro-channel with an insoluble polymeric salt; (b) increasing the impact strength of dental fillers through ionic binding of the polymeric chain that acts as an impact modifier; (c) increasing the impact strength of cement ionomers through the ionic binding of the impact modifying polymer; (d) pretreating the surface of dentine for improved adhesion to dental filling; (e) surface-coating to provide an adherent dental varnish or a controlled release system for fluorides and other dental agents for treating infections (including microbial ones) or pain; and (f) interfacial-bonding of phosphonylated fibers to a methacrylate-based matrix for producing high impact dental composites.

2. Phosphonylated Polyethylene Oxides (PEO) and Derivatives—These can be used as drug carriers in different controlled release systems, such as those used in transdermal delivery with or without employing an iontophoretic scheme. Other uses of the PEO phosphonic acid derivatives can include those pertinent to cold sterilization and disinfection.

Phosphonylated derivatives bearing phosphonyl dihalide groups can be used for covalently binding hydroxy- and/or amine-bearing bioactive compounds for their controlled release. Yet another application of phosphonic acid derivatives include their use as polyelectrolytes for flocculation. The phosphonic acid-bearing system can be used as a carrier of cationic drugs for controlling their release in oral, intranasal, intravaginal, or transdermal pharmaceutical formulations. The phosphonylated PEO can be used as a foam for protecting flammable objects exposed to an open flame.

3. Phosphonylated N-ethyl Nylon 12 and Derivatives—N-ethyl Nylon 12 with practically all the phosphonyl moieties present as phosphonic acid groups can be used as polymeric catalysts for the hydrolytic polymerization of lactams. The derivatives of the phosphonylated polymer carrying N-substituted $\epsilon$-caprolactam group can be used as a co-catalyst for the anionic polymerization of lactams into comb-shaped or crosslinked structures.

4. Phosphonylated Poly-$\epsilon$-Caprolactone and Its Derivatives—These can be used as primers for metallic fibers in polymeric composite applications. The alkyl-phosphonate groups can be used as flame-retarding additives for polyesters and polyurethanes.

Specific examples for the preparation of representative compositions are given below.

EXAMPLE 1

Phosphonylation of Low Molecular Weight Polymethyl Methacrylate

A two-neck 250 ml boiling flask containing a magnetic stir bar was assembled with a condenser in one inlet and a gas inlet tube in the other. The set up was flame dried under vacuum and cooled to room temperature under argon purge twice. Twenty grams of low molecular weight polymethyl methacrylate (PMMA) and 50 ml chloroform was added to the boiling flask. Once the PMMA was completely dissolved, 20 ml phosphorus trichloride was added to the solution. Oxygen was bubbled through the solution at 30 ml/min while stirring with the magnetic stir bar. The oxygen flow and stirring were continued at ambient temperature for 73 hours.

The condenser and gas inlet tube were removed from the flask and replaced with a full length glass stopper and 90° angle connector with stopcock. The system was placed under vacuum while stirring to remove the chloroform. Once the solvent was removed, the flask was purged flask with argon and 100 ml acetone was added to dissolve the material in the flask. After the residue was dissolved, 37 ml of 0.5 M HCl was added to the solution. After 48 hours, the solution was precipitated by blending in distilled ice water for 2 minutes. The precipitate was collected by filtering through a coarse Buchner funnel.

The precipitate was added to 500 ml distilled water and sonicated for 1 hour. The mixture was filtered through a coarse Buchner funnel, and the precipitate was collected. The precipitate was mixed with 250 ml distilled water and incubated at 37° C. for 1 hour. The water was decanted water, 250 ml distilled water was added, and the mixture was incubated at 37° C. for 1 hour; repeated fifteen times. The mixture was filtered through a coarse Buchner funnel. The precipitate was collected and dried under vacuum at 37° C. for 12 hours. The composition and properties of the polymer were determined by elemental analysis, dilute solution viscometry, titration, NMR, and IR spectroscopy.

EXAMPLE 2

Phosphonylation of Medium Molecular Weight PMMA

A two-neck 250 ml boiling flask containing a magnetic stir bar was assembled with a condenser in one inlet and a gas inlet tube in the other. The set up was flame dried under vacuum and cooled to room temperature under argon purge twice. Twenty grams of medium molecular weight PMMA and 100 ml chloroform was added to the boiling flask. Once the PMMA was completely dissolved, 20 ml phosphorus trichloride was added to the solution. Oxygen was bubbled through the solution at 30 ml/min while stirring with the magnetic stir bar. The oxygen flow and stirring were continued at ambient temperature for 91 hours.

The condenser and gas inlet tube were removed from the flask and replaced with a full length glass stopper and 90° angle connector with stopcock. The system was placed under vacuum while stirring to remove the chloroform. Once the solvent was removed, the flask was purged flask with argon and 100 ml acetone was added to dissolve the material in the flask. The solution was precipitated by blending in distilled ice water for 2 minutes. The precipitate was collected by filtering through a coarse Buchner funnel.

The precipitate was mixed with 250 ml distilled water and incubated at 37° C. for 1 hour. The water was decanted water, 250 ml distilled water was added, and the mixture was incubated at 37° C. for 1 hour; repeated twenty-three times. The mixture was filtered through a coarse Buchner funnel. The precipitate was collected and dried under vacuum at 37° C. for 12 hours. The composition and properties of the polymer were determined as described in Example 1.

EXAMPLES 3–23

Twenty additional phosphonylated PMMA derivatives are prepared using similar or slightly modified reaction conditions and characterization methods as those described in Examples 1 and 2. A summary of the prevailing reaction conditions and analysis (for % P) of the products are presented in Table I.

TABLE I

Reaction Conditions and Properties of Resulting Products

| Example | Product Number | PMMA** | Solvent | PCl$_3$ (ml) | Rxn Time (hr.) | % P |
|---|---|---|---|---|---|---|
| 1 | PM-9 | 20 g Low MW | 50 ml chloroform | 20 | 73 | 1.45 |
| 2 | PM-10 | 20 g Medium MW | 100 ml chloroform | 20 | 91 | 1.88 |
| 3* | PM-1 | 5 g Medium MW | 15 ml chloroform | 5 | 21 | 6.24 |
| 4* | PM-2 S-1 | 5 g Medium MW | Chloroform | 10 | 16 | 2.19 |
| 5* | PM-2 S-2 | 5 g Medium MW | Chloroform | 10 | 16 | 4.21 |
| 6* | PM-3 | 10 g Medium MW | 24 ml chloroform | 10 | 27 | 2.77 |
| 7* | PM-5 | 5 g Medium MW | 25 methylene chloride | 5 | 28 | 2.07 |
| 8 | PM-6 Lot 1 | 10 g Low MW | 50 ml methylene chloride | 10 | 26 | 1.48 |
| 9 | PM-6 Lot 2 | 10 g Low MW | 50 ml methylene chloride | 20 | 24 | 1.35 |
| 10 | PM-7 | 20 g Low MW | 50 ml methylene chloride | 20 | 40 | 1.31 |
| 11 | PM-8 | 20 g Medium MW | 100 ml methylene chloride | 20 | 48 | 1.54 |
| 12 | PM-11 | 40 g Low MW | 100 ml chloroform | 40 | 47.5 | 0.52 |
| 13 | PM-12 | 40 g Medium MW | 200 ml chloroform | 40 | 94 | 1.14 |
| 14 | PM-13 | 40 g Low MW | 100 ml chloroform | 40 | 99 | 1.34 |
| 15 | PM-14 | 40 g 120K MW | 125 ml chloroform | 40 | 42 | 1.32 |
| 16 | PM-15 | 60 g Low MW | 150 ml methylene chloride | 60 | 48 | 1.07 |
| 17 | PM-16 | 60 g High MW | 200 ml chloroform | 60 | 91.5 | 1.39 |
| 18 | PM-17 Lot 1 | 10 g Low MW | 25 ml chloroform | 10 | 74 | 1.43 |
| 19 | PM-17 Lot 2 | 30 g Low MW | 75 ml chloroform | 30 | 104 | 1.42 |
| 20 | PM-18 Lot 1 | 120 g High MW | 455 ml chloroform | 120 | 120 | 1.41 |
| 21 | PM-19 Lot 1 | 10 g Low MW | 25 ml chloroform | 10 | 96 | 1.85 |
| 22 | PM-19 Lot 2 | 20 g Low MW | 50 ml chloroform | 20 | 105 | 1.41 |
| 23 | PM-20 Lot 1 | 120 g High MW | 450 ml chloroform | 120 | 96 | 1.45 |

*These samples were prepared without provision for condensing liquid vapors.
**Low MW PMMA M$_w$ = 34,473
Medium MW PMMA M$_w$ = 73,227
High MW PMMA M$_2$ = 427,150

EXAMPLE 24

Phosphonylated PMMA Reacted with Hydroxyethyl Methacrylate

A two-neck 250 ml boiling flask containing a magnetic stir bar was assembled with a condenser in one inlet and a gas inlet tube in the other. The set up was flame dried under vacuum and cooled to room temperature under argon purge twice. Thirty grams of low molecular weight polymethyl methacrylate (PMMA) and 75 ml chloroform was added to the boiling flask. Once the PMMA was completely dissolved, 15 ml phosphorus trichloride was added to the solution. Oxygen was bubbled through the solution at 30 ml/min while stirring with the magnetic stir bar. The oxygen flow and stirring were continued at ambient temperature for 71 hours.

The condenser and gas inlet tube were removed from the flask and replaced with a full length glass stopper and distillation arm connected to a collection flask. The system was placed under vacuum at 50° C. while stirring to remove the chloroform. Once the solvent was removed, the flask was purged flask with argon and 60 ml chloroform was added to dissolve the material in the flask. After the residue was dissolved, 6.1 ml 2-hydroxyethyl methacrylate was added to the solution. After 5 days, the solution was precipitated by blending in distilled ice water. The mixture was left to settle in beakers and the water was then decanted. The solid portion was then transferred to a 2 L resin kettle and placed under vacuum to remove chloroform. The solid portion was rinsed several times with distilled water through vacuum filtration. Collected precipitate and dried under vacuum at 37° C.

The product contained 1.30% phosphorus and 1.16% chlorine and had a molecular weight of 9,023.

EXAMPLE 25

Phosphonylated PMMA Reacted with Glycidyl Methacrylate

A two-neck 250 ml boiling flask containing a magnetic stir bar was assembled with a 90° angle connector with stopcock. The set up was twice flame dried under vacuum and cooled to room temperature under argon purge. The following were then added to the flask: 5.0 g 2-butanol; 3.0 g PM-14; 0.005 g 4-methoxyphenol; 0.0015 g 1,4-diazabicyclo-[2,2,2]oxetane; 1.5 g glycidyl-methacrylate; 100 g ethyl acetate; and 50 g methanol. A sample was removed for FTIR analysis prior to reacting. The mixture was then heated to 60° C. under positive argon pressure for 48 hours.

The 90° angle connector with stopcock was removed from the flask and connected to a distillation head and the assembly was heated to 70° C. under vacuum for 45 min. The remaining mixture was precipitated blending in distilled ice water. The precipitate was collected by filtering through a coarse Buchner funnel.

EXAMPLE 26

Phosphonylated PMMA Reacted with Glycidylmethacrylate

A two-neck 250 ml boiling flask containing a magnetic stir bar was assembled with a 90° angle connector with stopcock. The set up was twice flame dried under vacuum and cooled to room temperature under argon purge. The following were then added to the flask: 5.0 g 2-butanol; 3.0 g PM-14; 0.005 g 4-methoxyphenol; 0.0015 g 1,4-diazabicyclo-[2,2,2]oxtane; 1.5 g glycidylmethacrylate; 100 g ethyl acetate; and 50 g methanol. A sample was removed for FTIR analysis prior to reacting. The mixture was then heated to 60° C. under positive argon pressure for 48 hours.

The 90° angle connector with stopcock was removed from the flask and connected to a distillation head and the assembly was heated to 70° C. under vacuum for 45 min. The remaining mixture was precipitated by blending in distilled ice water. The precipitate was collected by filtering through a coarse Buchner funnel.

EXAMPLE 27

Calcium Salt of Phosphonylated PMMA of Example 21

The preparation and characterization of the calcium salt (to simulate the reaction of the PPMMA reaction with $Ca^{+2}$ in the biologic environment) can be summarized as follows: 2% of PPMMA of Example 21 was dissolved in ethanol then centrifuged (solubility was about 47%) to the clear solution, 5 drops of a 1M $CaCl_2$ solution were added, the precipitate was centrifuged and washed twice with ethanol, then dried by vacuum for 4 days. SEM/EDX analyses of the resulting microparticles were performed for Ca, P, O, C, Cl.

EXAMPLE 28

Preparation of Dental Varnish

A tooth varnish was prepared by mixing 1.186 ml of a 2.5 mg/ml solution of a 75/25 methyl methacrylate-methacrylic acid copolymer (MMA/MAA) in ethanol with 50 µl of 2.5 mg/ml solution of the PPMMA of Example 23 in ethanol in a sterile centrifuge tube. To this, 4 µl of a 2.5 mg/ml solution of chlorhexadine diacetate in ethanol was added to yield a final concentration of 0.1 µg/15 µl.

EXAMPLE 29

Preparation of Dental Varnish

For this, a procedure similar to that used in Example 28 was followed with the exception of substituting the 75/25 MMA/MAA copolymer with its 67/33 analog to yield a final concentration of 3.75 µg/15 µl.

EXAMPLE 30

Coating of Porcelain and Bovine Teeth as Models for Dentine

Porcelain and precut, scoured teeth were sanded with a fine-grade sand paper. Both substrates were rinsed thoroughly with isopropyl alcohol and dried at room temperature for 48 hours prior to use. Triplicate samples of both porcelain or bovine teeth were then coated with the dental varnish of Examples 28 or 29 to reach the desired concentration.

EXAMPLE 31

Drug Release Evaluation of Coated Porcelain

Porcelain chips from Example 30 were coated with a formulation of Example 28 and placed in separate glass vials with 1 ml of distilled water. The containers were then capped and placed in a 37° C. incubator. Aliquots were taken at various periods of time and analyzed by HPLC using a 20–80% acetonitrile gradient and a C18 column and UV detector (220 nm). After 30 hours of incubation at 37° C., a total of 0.6 μg or 1.5% of the total drug loading was released.

EXAMPLE 32

Drug Release Evaluation of Coated Teeth

The bovine teeth described in Example 30, which were coated with the formulation of Example 29, were evaluated in a similar manner as described in Example 31. The results indicate that 70% of the drug is released at 3 days.

The foregoing description of preferred embodiments of the invention has been presented for illustration, and is not intended to be exhaustive. Modifications are possible in light of the above teachings or may be acquired from practice of the invention.

What is claimed is:

1. A randomly phosphonylated polyalkylene oxide polymer comprising phosphorous-containing functional groups, wherein the phosphorous atom of each of the functional groups is covalently bonded to a carbon atom of the polyalkylene oxide polymer and wherein the phosphorous atoms comprise at least about 0.1 percent by weight of the total polymer weight.

2. The phosphonylated polyalkylene oxide polymer of claim 1 wherein the alkylene group comprises from two to six carbon atoms.

3. The phosphonylated polyalkylene oxide polymer of claim 1 further comprising a bioactive compound linked to the phosphorous-containing functional groups.

4. The phosphonylated polyalkylene oxide polymer of claim 1 wherein the phosphorous atoms comprise at least 0.5 percent by weight of the total polymer weight.

* * * * *